United States Patent [19]

Cameron

[11] Patent Number: 4,923,341

[45] Date of Patent: May 8, 1990

[54] PORTABLE DRILL GUIDE

[76] Inventor: James D. Cameron, P.O. Box 12, Madawaska, Ontario, Canada, K0J 2C0

[21] Appl. No.: 410,900

[22] Filed: Sep. 22, 1989

[51] Int. Cl.[5] .............................................. B23B 49/00

[52] U.S. Cl. ...................................... 408/112; 408/712

[58] Field of Search .................... 408/14, 95, 110, 112, 408/115 R, 712; 279/1 A

[56] References Cited

U.S. PATENT DOCUMENTS

| | | | |
|---|---|---|---|
| 2,622,458 | 12/1952 | Jenkins | 408/112 |
| 2,714,026 | 7/1955 | Schultz | 279/1 A |
| 2,831,376 | 4/1958 | Daniels | 408/112 |
| 3,464,295 | 9/1969 | Gallion | 408/112 |
| 3,550,481 | 12/1970 | Jensen | 408/112 |
| 3,827,822 | 8/1974 | Converse | 408/110 |
| 3,874,810 | 4/1975 | Russell | 408/110 |
| 4,242,016 | 12/1980 | Faris | 408/112 |
| 4,585,376 | 4/1986 | Davenport, Jr. et al. | 408/110 |

*Primary Examiner*—Daniel Howell

*Attorney, Agent, or Firm*—Arnold, White & Durkee

[57] ABSTRACT

Disclosed is portable drill guide apparatus for a hand held drill. The apparatus includes a base having an upper surface, a flat bottom surface and an annular opening therethrough, the opening having an axis. A support post extends from the base to one side of the opening and is perpendicular to the base bottom surface, the post having a longitudinally extending bore. A shot extends longitudinally in the side of the post and is parallel to the axis thereof. A drill chuck assembly comprises a bar complementary in cross-sectional shape to the bore and a chuck support. The support extends outwardly from the bar and has a portion adapted to move within the slot. The chuck support further includes a shaft journalled therein, the shaft having an upper end and a lower end with a drill chuck being operatively connected to the lower end over the base opening. An adapter is provided for operative association with a drill chuck of a portable drill and has means for detachable driving connection with the upper end of the chuck support shaft.

8 Claims, 4 Drawing Sheets

PORTABLE DRILL GUIDE

FIELD OF THE INVENTION

The invention relates to a portable drill guide and more particularly to a portable drill guide which is simple to use and allows for easier connection of the drill with the guide.

BACKGROUND OF THE INVENTION

Guides for assisting in the drilling of holes in materials such as wood, metals and plastics are well known in the art and exemplary of such drill guides are those set forth in the Jenkins U.S. Pat. No. 2,622,458, Dec. 23, 1952; Daniels U.S. Pat. No.2,831,376, Apr. 22, 1958; Converse U.S. Pat. No. 3,827,822, Aug. 6, 1974; Russell U.S. Pat. No. 3,874,810, Apr. 1, 1975; Haddon U.S. Pat. No. 4,729,698, Mar. 8, 1988 and Krogh U.S. Pat. No. 4,765,786, Aug. 23, 1988.

Many of the prior art devices such as Daniels, Converse, Haddon and Krogh require specially designed drills or require a suitable clamp or fastening means in association with the drill to secure the drill for movement with the guide.

Jenkins, on the other hand, discloses a guide device which accepts the chuck in a specially constructed journal supported conical holder through which a drill in the drill chuck of the drill extends. The guide is not effective in practice to maintain the angle of the drill perfectly straight if the operator does not hold the drill straight.

Russell, discloses a two column drill guide wherein the chuck of the drill must be removed from the drill and relocated on the drill guide and the drill itself fastened in such manner that the drill and guide are not thereafter easily separated.

Russell, Haddon, Krogh and Lavering et al, (U.S. Pat. No. 3,381,551, May 7, 1968) disclose as part of their devices or separately (Lavering et al) means for locating the drill guide on the edge of material when drilling holes in the edge of the material. However, these centering or locating systems are not easily and simply adapted for drilling holes in the edges of sheet material or the like.

Accordingly, there is a need for a simple drill guide that may be used with a portable hand drill without having to fasten the drill to the guide or use a specially designed drill and for a drill guide which will also provide for centering the drilling of holes on edges of material without significant adjustment. Further there is a desire to provide a simple depth gauge and handle for use with the drill guide.

SUMMARY OF THE INVENTION

The drill guide of the invention is easily portable and adapted for use with any portable drill currently marketed with little or no preparation required for operatively attaching the drill to the drill guide. The drill guide has its own drill chuck and an adapter for the drill itself which cooperates with a part of the drill guide chuck assembly facilitating ease of operation of the drill guide and drilling without special attachment means or configurations.

Further, slots in the base of the drill guide of preselected width permit the guide to be located over the edge of most thin boards and centered for drilling the holes in the edges. The slots also serve to hold bar stock or locate the guide in bar stock as desired.

Accordingly, the invention in one aspect pertains to portable drill guide apparatus for a hand held drill including a base having an upper surface, a flat bottom surface and an annular opening having an axis therethrough. A support post extends from the base upper surface and is perpendicular to the base bottom surface, the post having a longitudinally extending axial bore and there is a slot extending longitudinally in the side of the post and facing in the direction of the base opening. A drill chuck assembly includes a bar which is complementary in cross-sectional shape to the bore and includes a plate extending outwardly from the bar and the bar and plate being adapted to slidingly move within the bore and slot respectively. The chuck assembly further has a chuck supporting head on the free end of the plate with a shaft journalled in the head having an axis spaced from and parallel to the axis of the support post. The shaft having an upper end and a lower end and a drill chuck being operatively connected to the lower end over and axial with the base opening. There is also an adaptor means for operative association with a drill chuck on a portable drill and it has means for detachable connection to the upper end of the shaft and for rotating the shaft.

The portable drill guide apparatus in another aspect has at least one rectangular slot of preselected width which intersects the axis of the base opening, the base opening axis being aligned with the axis of the chuck assembly shaft. Preferably the portable drill apparatus has two sets of grooves of different widths.

Still further, in another aspect the portable drill apparatus may include a drill depth gauge comprising means for longitudinally adjustably securing the gauge to the column and including rule means extending longitudinally adjacent the post. The chuck assembly head has means for operative cooperation with the gauge whereby the depth of movement of the drill chuck assembly in a drilling direction can be controlled.

Still further, handle means are provided which can be attached to the base of the guide or to the post of the guide as circumstances dictate.

Other aspects and features of the invention will become more apparent from the detailed description of the preferred embodiment herein.

DESCRIPTION OF THE PREFERRED EMBODIMENT

Figure 1:
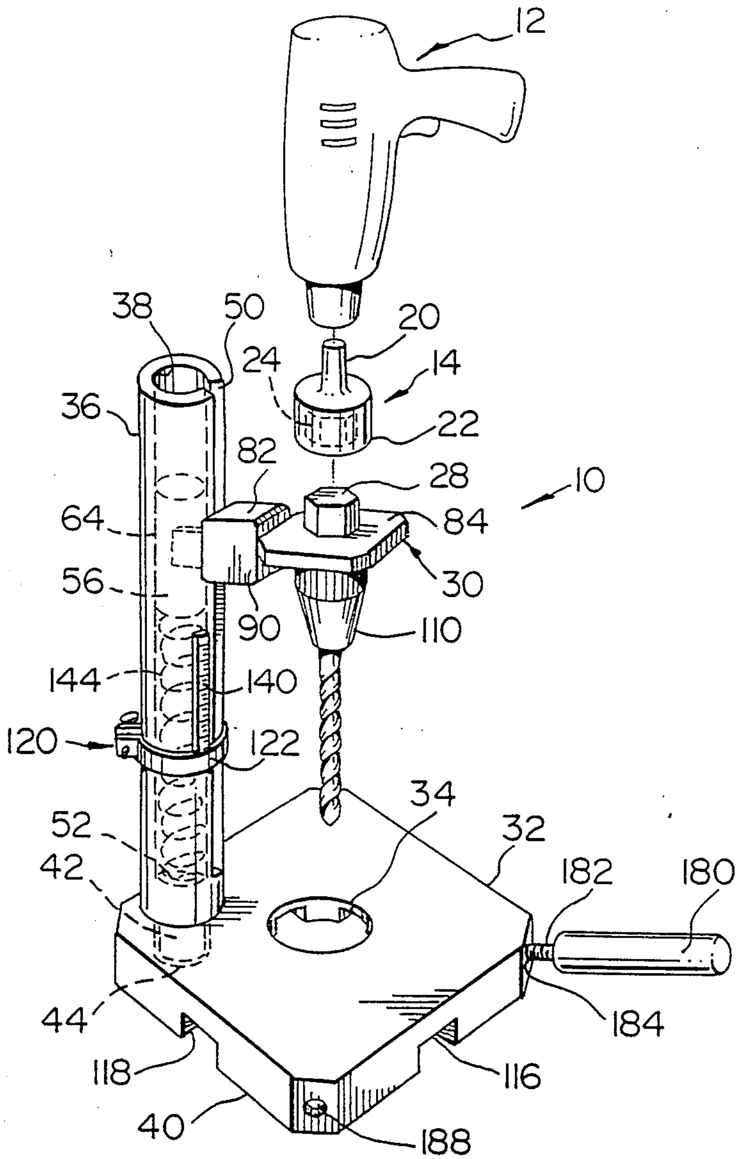
FIG. 1 is a perspective view of the drill guide with an exploded view of the drill and adapter relative to the guide structure.

FIG. 1 illustrates drill guide 10 with a typical drill 12 shown in an exploded position from the drill guide. Adapter 14 is shown between drill 12 and guide 10.

Adapter 14 comprises shank 20 integral with housing portion 22 which housing portion has an axial opening 24 with a cross-sectional configuration for cooperative association with the shank 28 of the drill guide assembly 30.

Drill guide 10 has base 32 shown as generally squarish with chamfered corners, with central opening 34, upstanding post or column 36 with vertical slotted bore 38 therein. Drill chuck assembly 30 cooperates with slotted bore 38 as detailed more fully herein.

Base 32 comprises a plate of suitable material such as aluminum to which post 36 is secured at right angles to flat bottom 40. Post 36 may be secured by annular portion 42 shown in dotted lines being press fitted into a complementary aperture 44 also shown in dotted lines in base 32, the bottom of annular portion 42 being flush with or slightly indented from flat bottom 40.

Longitudinal annular post bore 38 has slot 50 longitudinally accessing the bore 38 to the exterior of the post. Bore 38 extends axially within post 36 substantially to bottom 52. It will be appreciated that as an alternative, bore 38 could be drilled through post 36 including annular portion 42. A plug (not shown) would then be press fitted into the drilled opening adjacent portion 42 to provide additional support and rigidity.

Slot 50 extends in the illustrated embodiment of FIG. 1 to substantially the bottom 52 of such bore 38 although it need not coincide with the bottom 52 provided it extends sufficiently to permit the drill guide assembly 30 to function properly. The shape of bore 38 is shown circular but it will be appreciated it could be of different cross-sectional configuration such as rectangular (with rounded corners) or hexagonal.

Figure 2:
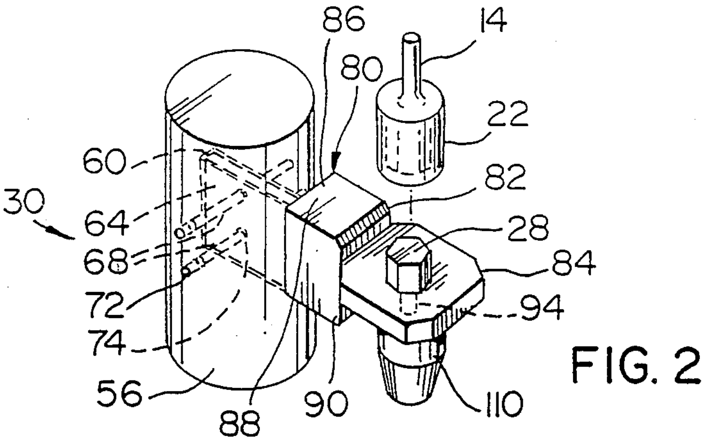
FIG. 2 is a perspective view of the drill guide assembly.

Drill chuck assembly 30, further shown in FIG. 2 with adapter 14, has guide bar 56 of complementary configuration to bore 38 but sized for longitudinal sliding movement within bore 38, the ends of bar 56 being rounded slightly to facilitate ease of movement of the bar 56 in bore 38. Bar 56 has elongate rectangular slot 60 machined or otherwise located therein into which rectangular plate 64 is press fitted. Plate 64 can further or alternatively be secured by press fitted pins 68 in apertures 72 which are drilled through bar 56, apertures 74 in plate 64 in cooperation with pins 68 locating and securing plate 64 within bar 56.

Although bar 56 is shown solid and of one diameter, it will be appreciated that the central portion of the bar inwardly of the ends, in the vicinity of slot 60, could be of slightly reduced diameter to that at the ends of the bar.

Integral with plate 64 or otherwise secured thereto is head portion 80 having plate section 82 and chuck section 84. Plate section 82 has flat face 86 facing slot 50 and adapted to slide closely adjacent post 36 at slot 50. Section 82 has upper surfaces 88 and 90 respectively.

Figure 3:
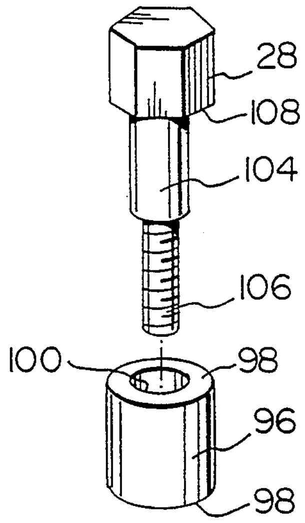
FIG. 3 is a perspective view of the journal bearing and guide assembly shaft.

Chuck section 84, integral with section 82, has bore 94 extending therethrough which bore has journal 96, FIG. 3, press fitted therein. Journal 96 has ends 98 and bore 100. Drill chuck shaft 104 has integral upper shank 28, which as previously noted, is complementary shaped (hexagonal in the drawings) to operatively cooperate with opening 24 in adapter 14. Between shank 28 and shaft 104 is flange 108 which rides on an upper end 98 of journal 96, shank portion 104 being adapted for rotatable association with journal bore 100. Lower shank 106 is threaded for connection with standard drill chuck 110 shown in FIG. 1. Shaft 104 is held to chuck section 84 in bore 100 by flange 108 riding on the upper end 98 of journal 96 and the threaded connection 106 with chuck 110. Appropriate lubrication to journal 96 and shaft 104 is made at the time of assembly.

Figure 4:
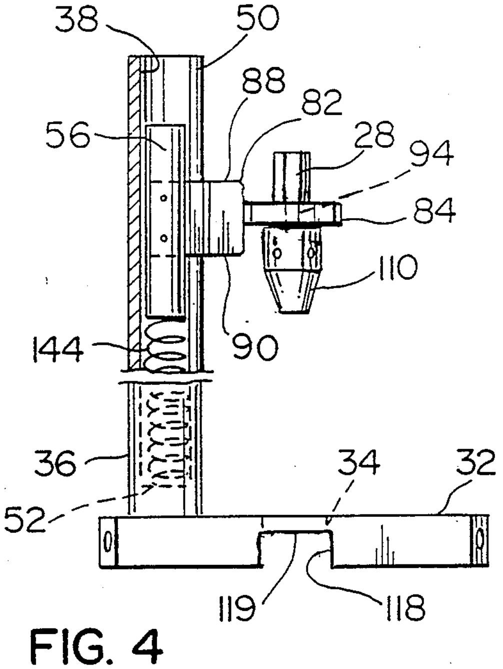
FIG. 4 is a side view of the drill guide partly in section.

FIG. 4 is a side view of the drill guide 10 showing guide bar 56 within bore 38.

Figure 5:
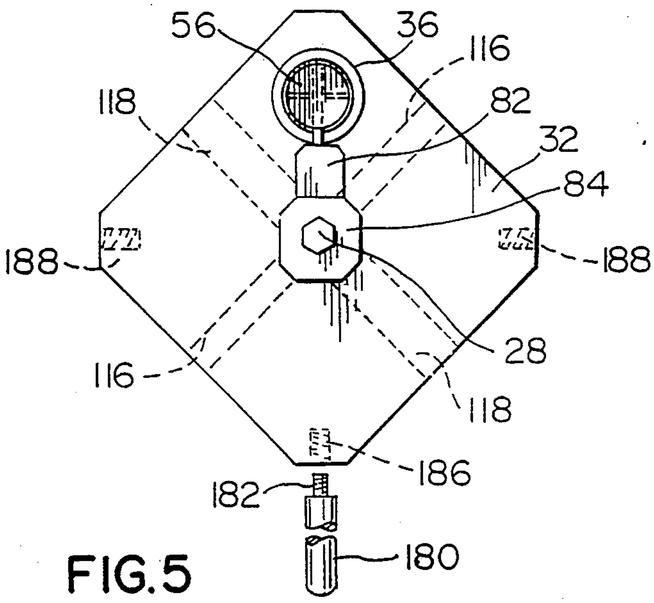
FIG. 5 is a top view of the drill guide.

FIG. 5 is a top view of the drill guide, showing base 32 and the slots 116 and 118 therein. Slot 116 and slot 118 are rectangular in cross sectional configuration (FIG. 4) and are located to facilitate the location of the base on an edge of sheet material such as plywood or pressed board, whereupon holes are to be centered and drilled. The width of slots 116 and 118 are preferably $\frac{3}{4}''$ and $1\frac{3}{8}''$ which are common thicknesses for sheets of wood but it will be appreciated these are only exemplary thicknesses and others are possible. The depth of slots 116, 118 is the same and is $\frac{2}{3}$ to $\frac{3}{4}$ the thickness of base 32 with flat bottom 119 parallel to base bottom 40.

As further described herein, (FIG. 8), the slots may also be used with boards thinner than the width of the slots and still facilitate easy centering of the drill guide for drilling holes in the edge of the sheet material.

Figure 6:
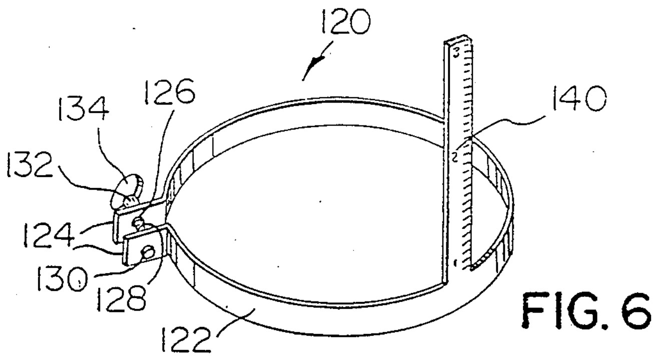
FIG. 6 is a perspective view of the drill depth guage.

Turning to FIGS. 1 and 6, the depth gauge 120 comprises a band 122 of material such as metal having ears 124 with holes, 126 adapted to accept screw 128 having flat end 130 larger than holes 126 and threaded end 132. Wing or thumb nut 134 is threadedly accepted on end 132 for pulling ears 124 together and tightening band 122 about post 36 at selected longitudinal locations. Rule 140 extends axially of band 122 adjacent slot 38 and is calibrated whereby the depth of the hole being drilled may be set. This is achieved resting a drill in chuck 110 on the workpiece, sliding depth gauge so that the depth desired appearing on the gauge is aligned with the bottom 90 of head section 80, and tightening wing nut 134 so that the gauge is clamped about post 36. When a hole is drilled, the bottom 80 contacts band 122 to limit the movement of drill chuck assembly 30.

As previously noted, drill guide chuck 110 once secured on threaded shank 106 locates and secures shaft 104 within journal 96 for rotatable association therewith.

Preferably compression coil spring 144 is located within post 38 between its bottom 52 and the bottom of bar 56 so that drill chuck assembly 30 is normally maintained in an upper positive relative base 32. Bore 38 is left open at the top of post 36 so that drill chuck assembly 10 can be removed from post 36 while a drill is secured in chuck 110.

In use, adapter 14 is secured in the standard chuck of a drill 12 and the appropriate sized drill is secured in chuck 110 of drill guide 30 detached from post 36. When the drill guide bar 56 is assembled with post 36, the drill in chuck 110 is located over the appropriate area in which a hole is to be drilled, the adapter 14 on the drill is located over shank 28, drill 12 turned on and moved axially in a line with the hole to be drilled, the drill being guided by the guide assembly 30 moving relative to post 36. When the hole is drilled, outward movement of drill 12 while in contact with shank 28 will enable spring 144 to raise the drill chuck assembly 30 to its normal, raised position.

If some form of snap connection between adapter 14 and shank 28 is used, such as that known for socket wrenches, the outward movement of the drill will itself tend to assist the spring 144 to return the drill guide to its normal, raised position.

Figure 7:
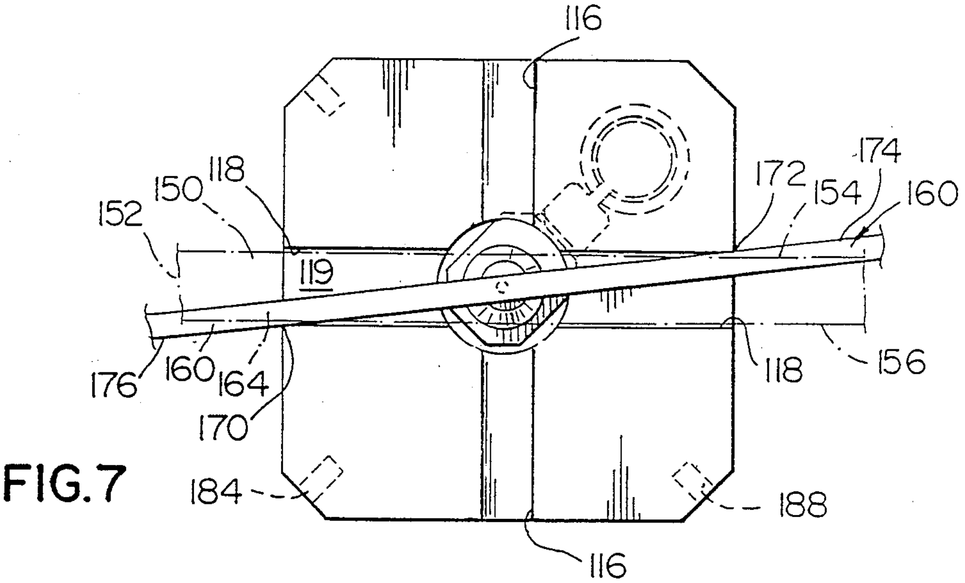
FIG. 7 is a bottom view of part of the drill guide of the invention in association with the edges of boards to be drilled.

In drilling a hole in the edge 150 of material 152 as shown in FIG. 7, material board 152 (dotted lines) is located in slot 118 with the edge 150 in firm contact with slot bottom 119. Board 152 is substantially the width of slot 118 so that the drill guide assembly is automatically centered relative to the sides 154 and 156 of the board material 152. The flat bottom 119 of slot 118 is held in firm contact with edge 150 of material 152.

If a small thickened board 160 is to be drilled, the edge 164 of the board 160 is located within slot 110 but the drill guide is rotated relative to board 160 so that diagonally opposite points 170, 172 of the slot contact, under slight pressure respectively adjacent sides 174, 176 of board 160 with slot bottom 118 held firmly against edge 164 and the relative rotation points in contact, the drill guide is centered on edge 164 of board 160 even though board 160 is thinner than the width of slot 118.

Other widths of slots 116, 118 obviously may be chosen.

To assist in holding drill guide 10, particularly when drilling edge holes, there is also provided a detachable handle 180 which has screw end means 182 to cooperatively fit with threaded aperture 184 in the chamfered corner of base 32. Like apertures 188 may be located at other corners so that the handle may be selectively located where best suited to holding and drilling material under particular circumstances.

Figure 8:
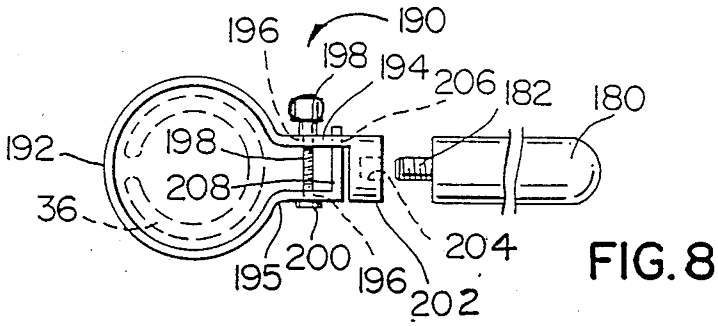
FIG. 8 is a top view of a handle clamp which will permit a handle to be clamped to the drill guide post.

FIG. 8 discloses a clamp 190 for connection to post 36 wherein handle 180 may be used. Clamp 190 comprises band 192 having ears 194, 195 having holes 196 through which extends threaded fastener 198. End 200 prevents fastener 198 being pulled through hole 196 and threaded wing nut 198 permits tightening of band 192 on post 36. Ear 194 has block portion 202 with threaded aperture 204 adapted to threadingly accept threaded end 182 of handle 180. Ear 194 also has a slot 206 adapted to slidingly receive tongue 208 of ear 195.

Clamp 190 with handle 180 secured thereto may be located anywhere along post 36 provided it does not interfere with movement of drill guide assembly 30.

It will be appreciated that with long drills, clamp 190 may be located on post 36 below the anticipated depth of movement of drill assembly 30. Band 192 can be modified to include a rule-like rule 140 (FIG. 6), in which case clamp 190 may serve selectively as a depth gauge, handle support or both.

It will be further apparent that my drill guide may be used on bar stock even if the bar is of a diameter larger than the slots since a slot may be aligned with the axis of the bar or pipe and the guide will center itself in view of the curvature of at least part of the bar within the associated slot.

By way of a further exemplary embodiment, a drill guide may have a column or post 36 of 1" diameter and be about 9" long extending from a base 32 of about $4\frac{1}{2}$" square and 1" thick. The rectangular grooves or slots 116, 118 in the base are about $\frac{5}{8}$" deep and of a width of $\frac{3}{4}$" and $1\frac{3}{8}$". Opening 34 is $1\frac{1}{2}$" in diameter. Bar 56 and bore 38 are about $\frac{3}{4}$" in diameter with the understanding that a sliding fit requires the tolerances to be appropriately adjusted. Bar 56 is about 3" long and with sections 82 and 84 about $1\frac{1}{4}$ and $\frac{7}{8}$ inches respectively depth in the axial direction.

Although I have disclosed a preferred embodiment of my invention, it will be apparent to those skilled in the art that variations to that embodiment are possible and are included within the scope of the invention as defined in the appended claims.

The embodiments of the invention in which an exclusive property or privilege is claimed are defined as follows:

1. Portable drill guide apparatus for a hand held drill comprising:

base means having an upper surface, a flat bottom surface and an annular opening therethrough, said opening having an axis;

a support post extending from the base to one side of said opening and perpendicular to the base bottom surface, said post having a longitudinally extending bore, slot means extending longitudinally in the side of said post and parallel to the axis thereof;

a drill chuck assembly comprising bar means complementary in cross-sectional shape to said bore and chuck support means extending outwardly therefrom and having a portion adapted to move within said slot;

said chuck support means further including a shaft journalled therein, said shaft having an upper end and a lower end with a drill chuck being operatively connected to the lower end over said base opening; and adapter means for operative association with a drill chuck of a portable drill and having means for detachable driving connection with the upper end of said chuck support shaft.

2. The portable drill guide apparatus as defined in claim 1 further including a compression coil spring within said post bore below said bar.

3. The portable drill guide apparatus as defined in claim 2 wherein said base has at least one rectangular slot of preselected width which intersects with the axis of said opening.

4. The portable drill apparatus as defined in claim 3 wherein said base has two slots of different widths generally at right angles to each other and both slots intersecting said opening.

5. The portable drill apparatus as defined in claim 3 further including a drill depth gauge comprising means for adjustably securing said gauge to said post, rule means associated with said securing means, said drill chuck assembly including means for operative cooperation with a portion of said gauge whereby to selectively enable the depth of movement of said drill gauge chuck assembly to be controlled.

6. The portable drill apparatus as defined in claim 5 including handle means for detachable securement with said apparatus in order to support said apparatus when drilling holes.

7. The portable drill apparatus as defined in claim 6 wherein said base includes means by which said handle can be detachably secured thereto.

8. The portable drill apparatus as defined in claim 6 including handle clamp means including means whereby said handle can be detachably secured to said post at selected locations.

* * * * *